US008797532B2

(12) United States Patent
Davidson et al.

(10) Patent No.: US 8,797,532 B2
(45) Date of Patent: Aug. 5, 2014

(54) SYSTEM AND METHOD FOR POLARIZATION MEASUREMENT

(75) Inventors: Nir Davidson, Rehovot (IL); Asher Friesem, Rehovot (IL); Moti Fridman, Rehovot (IL)

(73) Assignee: Yeda Research and Development Company Ltd., Rehovot (IL)

( * ) Notice: Subject to any disclaimer, the term of this patent is extended or adjusted under 35 U.S.C. 154(b) by 19 days.

(21) Appl. No.: 13/636,983

(22) PCT Filed: Mar. 24, 2011

(86) PCT No.: PCT/IL2011/000275
§ 371 (c)(1),
(2), (4) Date: Sep. 24, 2012

(87) PCT Pub. No.: WO2011/117873
PCT Pub. Date: Sep. 29, 2011

(65) Prior Publication Data
US 2013/0010295 A1    Jan. 10, 2013

Related U.S. Application Data

(60) Provisional application No. 61/317,000, filed on Mar. 24, 2010.

(51) Int. Cl.
*G01J 4/00* (2006.01)
(52) U.S. Cl.
USPC .......................................... 356/364; 356/365
(58) Field of Classification Search
USPC ............ 356/364–370, 73.1; 250/225, 227.17; 359/566, 568, 571, 615, 629; 385/37
See application file for complete search history.

(56) References Cited

U.S. PATENT DOCUMENTS

| 5,073,025 | A | 12/1991 | Brooks |
| 5,227,623 | A | 7/1993 | Heffner |
| 5,277,623 | A | 1/1994 | Colleran et al. |
| 5,298,972 | A | 3/1994 | Heffner |
| 5,973,838 | A | 10/1999 | Shirasaki |
| 7,679,744 | B2 | 3/2010 | Yamagaki et al. |

OTHER PUBLICATIONS

Mujat et al., "Real-time measurement of the polarization transfer function", Appl. Opt. 40: 34-44 (2001).
Martino et al.,"General methods for optimized design and calibration of Mueller polarimeters", Thin Solid Films 112:455-456 (2004).
Gori, "Measuring Stokes parameters by means of a polarization grating", Opt. Lett. 24: 584-586 (1999).

(Continued)

*Primary Examiner* — Tri T Ton
(74) *Attorney, Agent, or Firm* — Browdy and Neimark, PLLC

(57) ABSTRACT

Measuring polarization profile along an input optical beam cross-section using an optical system includes a polarization beam splitting assembly for splitting the input beam into a predetermined number of beam components with a predetermined polarization relation between them, and including a polarization beam splitter in an optical path of the input beam splitting it into beam components having a polarization relationship and a birefringent element in an optical path of the beam components for splitting each of them into a pair of beams having ordinary and extraordinary polarizations, thereby producing the predetermined number of output beam components. The pixel matrix is located in substantially non-intersecting optical paths of the output beam components and generates a number of output data pieces indicative of intensity distribution within the output beam components and data contained therein being indicative of the polarization profile along the input beam cross-section.

19 Claims, 9 Drawing Sheets

(56) References Cited

OTHER PUBLICATIONS

Biener et al., "Near-field Fourier transform polarimetry by use of a discrete space-variant subwavelength grating", J. Opt. Soc. Am. A 20:1940-1948 (2003).

Kim et al. "Measurement of the degree of polarization of the spectra from laser produced recombining Al plasmas", Phys. Rev. E. 66: 017401-1-0174401-4 (2002).

Fridman et al.,"Fiber lasers generating radially and azimuthally polarized light" Appl. Phys. Lett. 93:191104-1-1911104-2 (2008).

Oron et al. "The formation of laser beams with pure azimuthal or radial polarization", Appl. Phys. Lett. 77(21): 3322-3324 (2000).

Nordin G P et al., "Micropolarizer array for infrared imaging polaimetry", Journal of the Optical Society of America A, 16(5): 1168-1174 (1999).

Fridman et al: "Real-time measurement of space-variant polarizations", Optics Express, 18(10):10805-12 (2010).

FIG. 10A
FIG. 10B
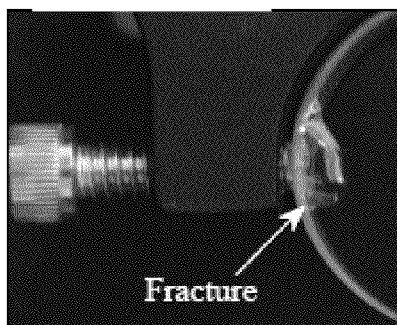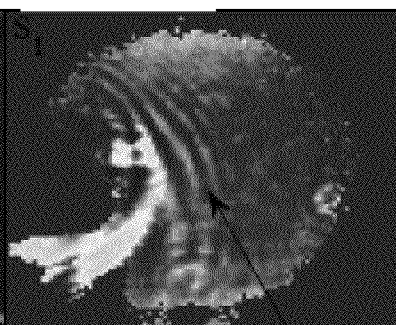
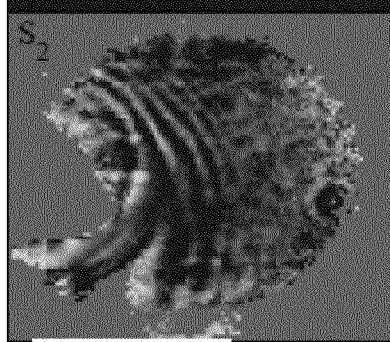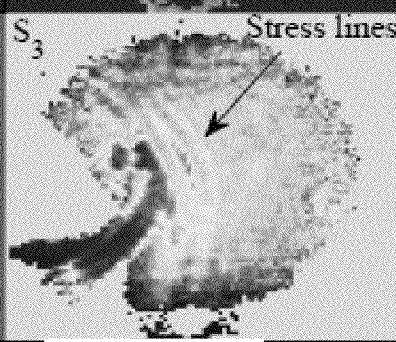
FIG. 10C
FIG. 10D

SYSTEM AND METHOD FOR POLARIZATION MEASUREMENT

FIELD OF THE INVENTION

This invention is in the field of polarization measurements and relates to a system and method for measuring polarization of an optical beam utilizing beam splitting into multiple beam components.

REFERENCES

The following is a list of references that can be used for better understanding of the background of the invention:
[1] G. P. Nordin, J. T. Meier, P. C. Deguzman, and M. W. Jones, "Micropolarizer array for infrared imaging polarimetry", *J. Opt. Soc. Am. A* 16, 1168 (1999).
[2] M. Muj at and A. Dogariu, "Real-time measurement of the polarization transfer function", *Appl. Opt.* 40, 34, (2001).
[3] D. Martino, E. Garcia-Caurel, B. Laude, and B. Drvillon, "General methods for optimized design and calibration of Mueller polarimeters", *Thin Solid Films* 112, 455 (2004).
[4] F. Gori, "Measuring Stokes parameters by means of a polarization grating", *Opt. Lett.* 24, 584 (1999).
[5] G. Biener, A. Niv, V. Kleiner, and E. Hasman, "Near-field Fourier transform polarimetry by use of a discrete space-variant subwavelength grating", *J. Opt. Soc. Am. A* 20, 1940 (2003).
[6] J. Kim, D. E. Kim, "Measurement of the degree of polarization of the spectra from laser produced recombining Al plasmas", *Phys. Rev. E.* 66, 017401 (2002).
[7] M. Fridman, G. Machavariani, N. Davidson, and A. A. Friesem, "Fiber lasers generating radially and azimuthally polarized light" *Appl. Phys. Lett.* 93, 191104 (2008).
[8] R. Oron, S. Blit, N. Davidson, A. A. Friesem, Z. Bomzon and E. Hasman, "The formation of laser beams with pure azimuthal or radial polarization", *Appl. Phys. Lett.* 77, 3322 (2000).

BACKGROUND OF THE INVENTION

Polarization measurements of an optical beam are needed for various analytic applications. Such polarization measurement techniques, often referred to as optical polarimetry, are utilized inter alia in ellipsometry, bioimaging, and imaging polarimetry.

A general polarization state of an optical beam can be defined by Stokes parameters. Stokes parameters are a set of four values describing the polarization state of an optical beam, or generally of electromagnetic radiation being coherent or incoherent radiation. Several commonly used methods for determining polarization state of an optical beam by represented Stokes parameters are based on measurement of time-dependent signal of the optical beam to transmitted through a rotating quarter-wave plate followed by a polarization analyzer. The polarization state can be determined by Fourier analysis of the detected output signal [1]. Other methods were developed aimed at providing a faster and simpler polarization measurement technique. Such methods are based on four-channel polarimeters [2] and utilize a beam splitter which divides the input beam into four channels. Each one of the split beam components is analyzed by use of different polarizing optics, and the polarization state of the input beam is calculated from the measured intensities of the four split beams. These techniques, however, suffer from a requirement for multiple polarizers and also from the fact that they can only provide polarization measurements for optical beams with uniform polarization [3].

For example, U.S. Pat. No. 5,298,972 describes an instrument including a polarized optical source for producing three sequential predetermined states of polarization of a light beam and an optical polarization meter for measuring the polarization of a portion of the light beam transmitted by or reflected from an optical network. According to this technique, the light beam is split into four beams; three of the beams pass through optical elements, and the transmitted intensity of all four beams is measured for calculating Stokes parameters. The light beam enters the optical polarization meter through a single-mode optical fiber that acts as a spatial filter for controlling the position and alignment of the beam with respect to the optical elements. The distortion of the light beam polarization caused by this optical fiber is corrected by introducing two different linearly polarized light beams and measuring Stokes parameters which are used to construct a calibration matrix that is inverted and multiplied times measured Stokes parameters of subsequent measurements to yield true Stokes parameters. The three sequential predetermined states of polarization yield three corresponding Jones input vectors, and the Stokes parameters for the responses of the optical network are converted to three Jones output vectors. A Jones matrix for the optical network to within a complex constant is then computed from the Jones input and output vectors. Relative polarization sensitivity can be determined from this matrix for the optical network. The relative distortion caused by the optical network can be corrected by multiplying by the inverse of the matrix during later measurements through the optical network. Additionally, power measurements on the optical network and proper substitutions enable absolute determinations and corrections.

U.S. Pat. No. 5,227,623 describes an instrument that includes a polarized optical source for producing three sequential predetermined states of polarization of a light beam at each of at least two wavelengths, as well as an optical polarization meter for measuring the polarization of a portion of the light beam at each wavelength transmitted by or reflected from an optical network by splitting it into four beams, passing three of the beams through optical elements, measuring the transmitted intensity of all four beams, and calculating Stokes parameters. The three sequential predetermined states of polarization at each wavelength yield three corresponding Jones input vectors at each wavelength, and the Stokes parameters for the responses of the optical network are converted to three Jones output vectors at each wavelength. A Jones matrix for the optical network to within a complex constant is then computed from the Jones input and output vectors at each wavelength. Polarization mode dispersion in the optical network is determined from these matrices.

Recently, new approaches have been developed, providing a capability for space-variant polarization profiling of an optical beam. Some of such polarimetry techniques utilize polarization gratings and a polarizer [4]. Theoretical studies and experimental demonstrations of applicability showed a use of sub-wavelength dielectric gratings [5]. Other newly developed techniques involve a use of a calcite crystal for splitting an input beam into beam components of two orthogonal polarizations. The two components, having ordinary and extra-ordinary polarizations with respect to an axis of the calcite crystal, are directed each to a different detector to obtain real-time polarization measurement [6].

U.S. Pat. No. 7,679,744 provides a Stokes parameter measurement device and Stokes parameter measurement method. The Stokes parameter measurement device comprises a polarization splitting device which comprises an optical element formed of a birefringent crystal material and which, by means of the optical element, splits signal light to be measured into a plurality of polarized light beams and adjusts the polarization state of one or more among the plurality of polarized light beams, and a light-receiving portion for performing photoelectric conversion of an optical component of the signal light split by and emitted from the polarization splitting device.

The above described polarization measurement techniques, as well as currently existing polarization measurement systems, are based on several sequential measurements combining mechanical rotation of polarization elements between one measurement to the next, and are hence expensive, complicated and slow [7].

General Description

There is a need in the art for a novel polarization measurement technique which is capable of providing, in real-time, information about the full polarization state of an optical beam, i.e. space-varying polarization and/or wavelength-varying polarization. The present invention provides a novel approach for real time determination of a space-varying polarization profile of an optical beam, i.e. technique capable of measuring polarization distribution (profile) along the cross-section of the beam. Also, the measurement is sensitive to temporal variations in the polarization state across the beam.

The technique of the present invention provides a system and method for polarization measurement of an optical beam having non-uniform polarization distribution such as radially and azimuthally polarized beam. The invention is capable of providing time-varying polarization profile of any general or randomly polarized optical beam. Optical beams having space and time varying polarization states are extremely useful in various applications such as microscopy, material processing, trapping and acceleration of particles, laser light amplifications, and polarization encryption applications.

The polarization measurement technique of the present invention is based on splitting an input optical beam into a predetermined number of substantially parallel beam components, each having a predetermined shift in the polarization state with respect to other beam components. The beam components are simultaneously detected using a pixel matrix, such as a CCD camera, to determine intensity distribution within each of the beam components. The polarization state distribution along the cross-section of the input optical beam is determined in real time according to the detected intensity distribution of the beam components utilizing determination of Stokes parameters.

The polarization state of the input optical beam can be described by distribution of Stokes parameters along the cross-section of the beam. Stokes parameters are a set of four values describing the polarization state of electromagnetic radiation, often presented as a vector $(S_0, S_1, S_2, S_3)$. According to the invention, the Stokes parameter vector is determined for each point (image pixel) along the cross-section of the input beam in accordance with the intensity distribution across each of a predetermined number of split beam components, as detected by the pixel matrix.

The input optical beam is divided into a certain number (preferably three) beam components by a first polarization beam splitter, which is configured to impose, while splitting, a different polarization rotation on each of the split beam components. A birefringent element, for example a calcite crystal, is located in an optical path of the three split beam components and configured to further split each of these beam components into a pair of spatially separated output beam components of ordinary and extraordinary polarizations with respect to an axis of the birefringent element. The intensity distribution within each of the output beam components is detected by a pixel matrix located in an optical path of said beam components. Stokes parameters' distribution which represents the polarization distribution of the input optical beam can be determined according to the intensity distribution of the output beam components detected by the pixel matrix. A time dependent polarization state of the input beam may be determined according to the intensity distribution of the output beam components detected at a frame rate of said pixel matrix.

The invention may also provide for polarization measurement as a function of wavelength. This can be achieved by utilizing a grating in between the first polarization beam splitter and the birefringent element to spatially separate different wavelength components of the input optical beam. A narrow slit may be used being located upstream of the first polarization beam splitter in order to obtain both wavelength-dependent and one-dimensional varying polarization distribution of the input beam.

According to one broad aspect of the invention, there is provided a system for use in measuring polarization of an optical beam, wherein the system is configured and operable for determining polarization profile along a cross section of the input optical beam. The system comprises an optical system which comprises a polarization beam splitting assembly, and a pixel matrix. The polarization beam splitting assembly is configured and operable for splitting the input optical beam into a predetermined number of beam components with a predetermined polarization relation between them. The polarization beam splitting assembly comprises a first polarization beam splitter in an optical path of the input optical beam splitting the input optical beam into a first plurality of beam components with a certain polarization relation between them and a birefringent element in an optical path of the first plurality of the beam components for splitting each of them into a pair of ordinary and extraordinary polarization components, thereby producing said predetermined number of output beam components. The pixel matrix detects intensity distribution within a beam incident thereon. The pixel matrix is located in substantially non intersecting optical paths of the output beam components and generates a corresponding number of output data pieces indicative of intensity distribution within the detected output beam components, respectively. Data contained in these data pieces is indicative of the polarization profile along the cross section of the input optical beam.

The system is associated with a control unit connectable to the output of the pixel matrix and configured and operable to receive the measured data (multiple data pieces), analyze the intensity distribution within each of the output beam components, and determine Stokes parameters of the input optical beam which are indicative of the polarization profile of the beam.

Preferably, the system produces six output beam components. The first polarization beam splitter is configured and operable to produce from the input optical beam three spatially separated beam components of different polarizations.

The determined polarization profile may correspond to space and time variant of polarization components within the cross-section of the input optical beam.

In some embodiments of the invention, the first polarization beam splitter comprises first and second reflective surfaces accommodated in a spaced-apart substantially parallel planes intersecting with an optical axis of light propagation through the system. The first reflective surface is partially reflective and has a segment thereof located in the optical path of the input optical beam thereby splitting said input optical beam into a first portion transmitted through said first polarization beam splitter towards the birefringent element and a second portion reflected towards the second reflective surface. The second reflective surface is relatively highly reflective and reflects said second beam portion towards a segment of the first reflective surface. The first and second reflective surfaces thereby operate together to sequentially reflect and split portions of said input optical beam into said first plurality of beam components propagating along spatially separated optical paths to the birefringent element.

In some embodiments of the invention, the first polarization beam splitter comprises an optically transparent plate having first and second parallel sides at least partially coated with reflective coatings defining said first and second reflective surfaces. The first sides of the optically transparent plate is coated to provide partially reflective surface and has a segment thereof located in the optical path of the input optical beam thereby splitting said input optical beam into a first portion transmitted through said first polarization beam splitter towards the birefringent element and a second portion reflected towards the second reflective surface. The second opposite side of the optically transparent plate comprises a segment which is coated to provide high reflective surface. The first and second coated surfaces of said optically transparent plate thereby operate to sequentially reflect and split portions of said input optical beam into said first plurality of beam components propagating along spatially separated optical paths to the birefringent element. In some other embodiments, the first and second reflective surfaces are constituted by separate spaced-apart elements (mirrors).

In some embodiments, the first and second surfaces are located in the planes forming a predetermined angle with the optical axis, thereby causing polarization rotation of beam components interacting with said first and second surfaces, thereby producing said predetermined polarization relation between the beam components in said first plurality. This may be a 88 degrees angle, or 33 degrees angle. In some other embodiments, the first polarization beam splitter comprises a polarization rotator located between said first and second reflective surfaces (e.g. a quarter wave plate oriented at an angle with respect to the optical axis) to thereby provide said polarization relation between the beam components emerging from the first polarization beam splitter towards the birefringent element. In either of these embodiments, the beam interactions with the first polarization beam splitter results in an optical delay between polarization components of each interacting beam component, thus actually inducing polarization rotation and thus polarization difference between each two locally adjacent beam components emerging from the first polarization beam splitter. For example, the optical delay of $\lambda/4$ corresponds to $\pi/2$ phase difference between the polarization components of the beam.

In some embodiments, the system comprises a grating located between the first polarization beam splitter and the birefringent element, and configured to diffract different wavelengths of the input optical beam. Preferably, a focusing lens assembly is located in the optical path of the beam components propagating from the grating to the birefringent element. Also, the system may include a slit (aperture) located in an optical path of the input optical beam.

According to another broad aspect of the invention, there is provided an optical device for use in a measurement of polarization profile along a cross section of an optical beam, the optical device comprising: a polarization beam splitting assembly configured and operable for splitting an optical beam into six beam components with a predetermined polarization relation between them, the polarization beam splitting assembly comprising a first polarization beam splitter in an optical path of said optical beam configured for splitting said optical beam into three spatially separated beam components with a certain polarization relation between them propagating along three spaced-apart substantially parallel optical paths, and a birefringent element located in said optical paths for splitting each of said three beam components into a pair of ordinary and extraordinary polarization components, thereby producing said six beam components; intensity distribution within of said six beam components of the optical beam being indicative of the polarization profile along the cross section of said optical beam.

According to yet further aspect of the invention, there is provided a method for use in measuring polarization of an optical beam, the method comprising: splitting the optical beam into three pairs of beam components with a predetermined polarization relation between the pairs, each pair comprising ordinary and extraordinary polarization components, measuring intensity distribution within each of said six beam components, analyzing the intensity distributions of the six beam components and determining a polarization profile along a cross section of the optical beam.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 3A-3C and 4A-4C show output of optical beam polarization measurement using a polarization measurement system of the invention, wherein FIGS. 3A-3C show the intensity distribution of output beam components and FIGS. 4A-4C show calculated Stokes parameters for linear polarization in a first plane (horizontal) (FIGS. 3A and 4A), linear polarization in a second plane at 45° orientation with respect to the first plane (FIGS. 3B and 4B), and circular polarization (FIGS. 3C and 4C);

FIG. 10A to 10D show experimental results for imaging with polarized illumination.

DETAILED DESCRIPTION OF EMBODIMENTS

Figure 1:
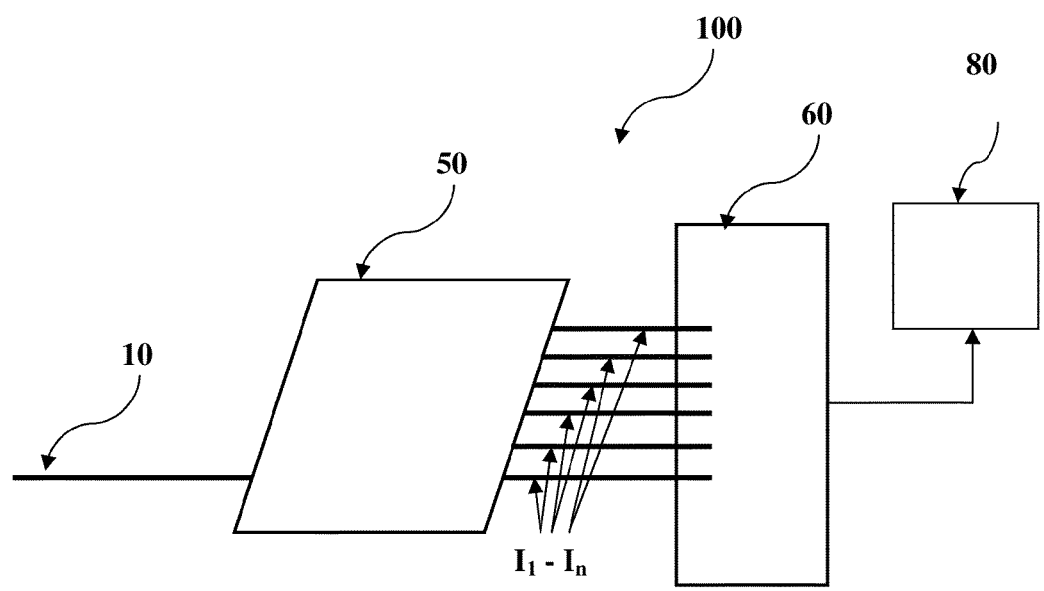
FIG. 1 illustrates in a way of a block diagram a system for space-variant polarization measurement according to the present invention.

Reference is made to FIG. 1 illustrating a bock diagram of a system 100 of the present invention for space- and time-varying polarization measurements of an input optical beam 10. The system 100 is configured and operable for determining polarization profile along a cross section of the input optical beam 10. The system 100 includes a polarization beam splitting assembly 50 and a pixel matrix 60. The polarization beam splitting assembly 50 is configured and operable for splitting the input optical beam 10 into a predetermined number of beam components with a predetermined polarization relation between them. The pixel matrix 60 is located in substantially non intersecting optical paths of the output beam components and receives the split beam components and detects intensity distribution within each of them. The pixel matrix 60 generates a corresponding number of output data pieces indicative of intensity distribution within the output beam components, respectively. Data contained in these data pieces is indicative of the polarization profile along the cross section of the input optical beam.

As shown in the figure, the polarization beam splitting assembly 50 divides the input optical beam 10 into a predetermined number of beam components $I_1$ to $I_n$ having predetermined polarization relations between them relative to predetermined axes defining linear polarization (vertical and horizontal axes). The split beam components $I_1$ to $I_n$ are detected by one or more pixel matrices 60 positioned in optical paths of the output beam components. The polarization state of the input beam 10 is determined by analyzing data pieces corresponding to the detected intensity distribution of each of the multiple beam components $I_1$ to $I_n$. To this end, the system 100 is associated with a control unit 80 (e.g. includes the control unit as its constructional part or has a communication port for connecting to an external control unit via wires or wireless signal transmission). The control unit 80 is typically a computer system including inter alia a data processing and analyzing utility preprogrammed for receiving multiple data pieces each corresponding to intensity distribution within an optical beam, processing these data pieces, determining the Stokes parameters of the input beam from which these beam components are originated, and generating output data indicative thereof. The output data may be in the form of the Stokes' parameters distribution across the beam or in the form of polarization profile across the beam.

Figure 2A:
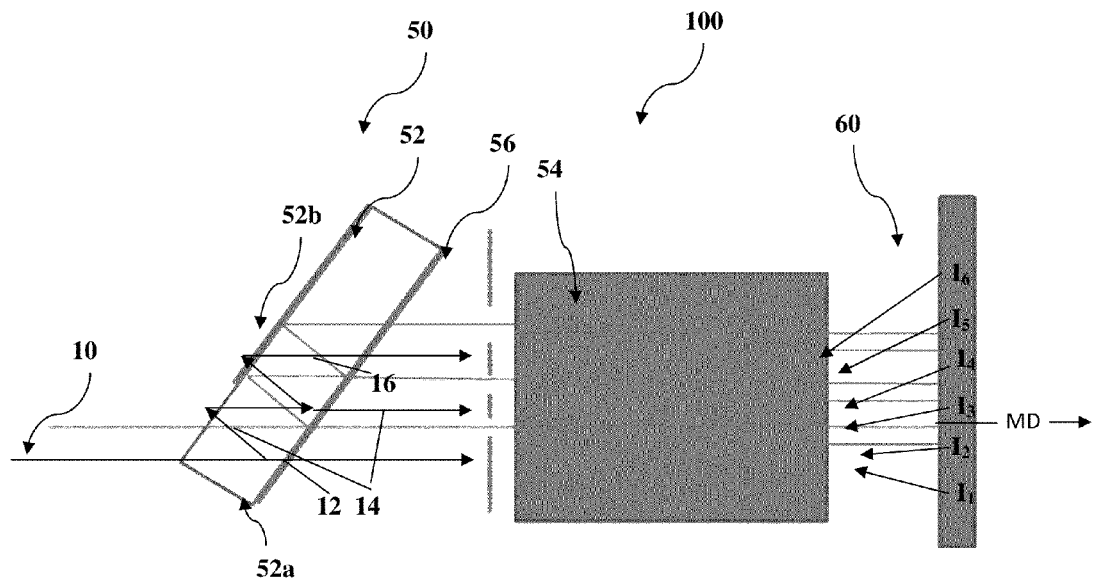
FIGS. 2A and 2B show two examples of a polarization measurement system according to embodiments of the present invention, where in the system of FIG. 2A reflective surfaces are implemented by reflective coatings on opposite sides of a transparent plate and in the system of FIG. 2B these are reflective surfaces of spaced-apart separate elements.
Figure 2B:
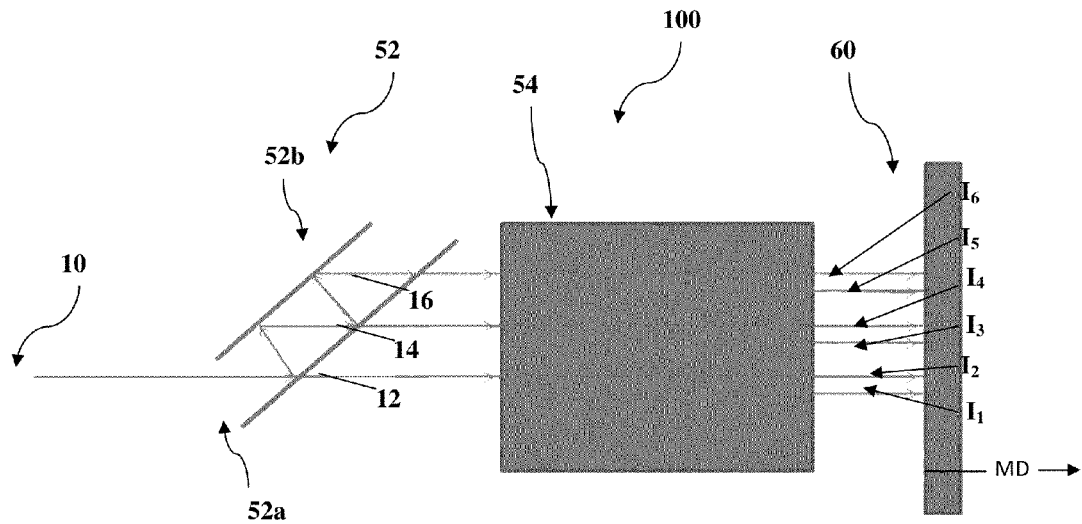

According to some embodiments of the invention, the polarization beam splitting assembly 50 includes a first polarization beam splitter and a birefringent element. Reference is made to FIGS. 2A and 2B each exemplifying a polarization measurement system 100 with such polarization beam splitting assembly 50 including the first polarization beam splitter 52 and the birefringent element 54, for example a calcite crystal. The polarization beam splitter 52 defines two reflective surfaces accommodated in a spaced-apart substantially parallel planes intersecting with an optical axis of light propagation through the system. In the example of FIG. 2A, such spaced-apart reflective surface are constituted by reflective coatings on opposite sides of a common transparent element. More specifically, the polarization beam splitter 52 is a transparent plate coated on both sides with reflective coatings to form partially reflective surface 52A and highly reflective surface 52B. In the example of FIG. 2B, the spaced-apart reflective surfaces are constituted by separate elements. More specifically, the polarization beam splitter 52 includes a pair of spaced-apart reflective elements located in substantially parallel planes arranged in a spaced-apart relationship along a direction of light propagation through the system.

In both examples, the first reflective surface 52a is partially reflective (about 80-98% of the optical beam is reflected) and the second surface 52b is highly reflective (almost 100% reflective). The two spaced-apart substantially parallel reflective surfaces are positioned in an optical path of the input optical beam 10 and are titled by a certain angle with respect to an optical axis of light propagation defined by the input beam propagation axis. An optical beam interaction with such arrangement of the reflective surfaces of different reflectivity results in a beam splitting during the beam interaction with the partially reflective surface and polarization rotation of the beam at each interaction thereof with either one of the reflective surfaces. More specifically, the interaction of the beam with the tilted reflective surface imposes an optical delay (which imposes a phase difference) between transverse electric (TE) and transverse magnetic (TM) polarization components, or between the horizontal and the vertical polarization components, of the beam being split.

It should be noted that polarization rotation is a result of optical delay between different polarization components of the optical beam. An optical delay of $\lambda/4$ is manifested by a phase difference of $\pi/2$ between the different polarization components. The term phase difference (for example phase difference of $\lambda/4$) is used herein to define an optical delay in order to enhance the clarity.

As illustrated in this example, the input optical beam propagating along the optical axis impinges onto the partially reflective surface 52a and becomes split into a first beam component 12 transmitted through the surface 52a towards birefringent element 54 and having the same polarization as the input optical beam 10, and a second beam component 14 reflected from surface 52a towards second reflective surface 52b, which reflects the beam component 14 back to surface 52a. The sequential reflection of the beam by tilted surfaces 52a and 52b results in a $\lambda/4$ phase difference between the vertical and horizontal polarization components. An optical delay (phase difference between polarization components) of $\lambda/4$ yields optimal signal to noise for the measured Stokes parameters according to the technique of the invention. However, the phase difference (optical delay) between the polarization components may be around $\lambda/4$, such as $\lambda/3$ or $\lambda/5$, however these configurations require certain modifications to the Stokes parameters determination process. Beam component 14 when interacting with surface 52a is split into beam component 14 partially transmitted towards birefringent element 54 and a beam component 16 partially reflected towards surface 52b which reflects this beam component back to surface 52a which partially transmits it to the birefringent element 54. In some configurations the tilting angle of the reflective surfaces (first polarization beam splitter 52) is such that imposes $\lambda/8$ phase difference between the transverse electric (TE) and transverse magnetic (TM) polarization components at each reflection, i.e. $\lambda/4$ phase difference after two reflections. Other configurations may be arranged with a different tilting angle, such that each reflection imposes $\lambda/16$ phase difference between the polarization components. In these configurations, only odd transmitted components are used, and a mask 56 may be used to block the even transmitted beam components. These sequential interactions of the beam with surfaces 52a and 52b results in that the third beam component 16 accumulates $\lambda/2$ phase difference between the two polarization components. The so produced three substantially parallel beam components 12, 14, and 16 having different polarization states propagate through the birefringent element 54, which splits each of these beam components into ordinary and extraordinary polarization components. Thus, the birefringent element 54 splits three incident beam components into six output beams $I_1$ to $I_6$, where beams $I_1$ and $I_2$ are ordinary and extraordinary polarization components of beam 12, beams $I_3$ and $I_4$ are ordinary and extraordinary polarization components of beam 14, and beams $I_5$ and $I_6$ are ordinary and extraordinary polarization components of beam 16.

Thus, in this example, the polarization beam splitter 52 defines two spaced-apart reflective surfaces 52a and 52b. This can be implemented by providing appropriate reflective coatings (e.g. silver coatings) on two opposite walls of an optically transparent plate 52. The coating 52a is configured to be partially reflective, with reflectivity of about 80%-98%, for example 90% reflectivity. The coating 52b of the opposite wall covers only part of said wall to allow the input optical beam 10 to propagate through said wall, and is configured to be almost 100% reflecting. The input beam 10 thus propagates through an uncoated region of the transparent wall and when interacting with partially reflective coating 52a bounces inside the transparent plate back and forth, resulting in formation of a plurality of parallel split beam components transmitted through the partially reflective coating 52a to the birefringent element.

As indicated above, the tilt angle of the reflective surfaces 52a and 52b with respect to the optical axis is selected to impose the appropriate phase difference between the polarization components of the optical input beam 10 emerging from the polarization beam splitter 52. For example, based on coupled wave analysis, the inventors have found that in the configuration of FIG. 2A, when gold coated reflective surfaces are used, accommodating the reflective surfaces 52a and 52b with the tilt angle of 33° with respect to the optical axis results in $\lambda/16$ phase difference between the TE and the ME polarization components of each of the output beams emerging from the polarization beam splitter 52. In this configuration, the three split beam components which are used for polarization measurements are only the odd beam components transmitted through the first reflective surface 52a towards the birefringent element 54 and a mask 56 is used to block the undesired even transmitted beam components. Using the same configuration with the tilt angle of 88° with respect to the optical axis results in $\lambda/8$ phase difference between the TE and the ME polarization components, and thus a smaller number of reflections inside the polarization beam splitter 52 is needed in order to impose the appropriate polarization difference between the beam components 12, 14 and 16. The same effect can be achieved using the configuration of FIG. 2B, i.e. utilizing a pair of spatially separated reflective surfaces 52a and 52b, using the tilt angle of 68°.

It should be noted that the exact tilt angle may differ in accordance with the reflective coating of the surfaces 52a and 52b, and with the refractive index of the transparent plate used (utilizing the configuration of FIG. 2A). Moreover, the phase differences imposed upon each reflection on the TE and TM polarization modes of the input optical beam might depend (although weakly) on the wavelength of the input beam.

Six output beams $I_1$ to $I_6$ are incident onto respective spaced-apart regions of a light sensitive surface of a pixel matrix 60, e.g. a CCD camera. Electrical output of the pixel matrix (measured data MD) contains six data pieces each indicative of the intensity distribution along the cross-section of the respective output beam component. Measured data MD of the intensity distribution of the output beam components is conveyed to the control unit (80 in FIG. 1) which processes this data for determining polarization state of the input optical beam 10, as will be described further below.

Figure 3A:
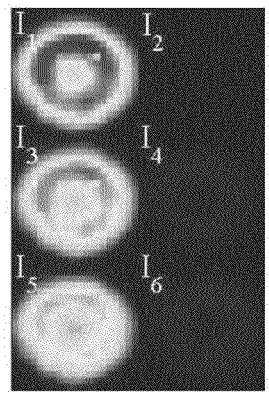
Figure 3B:
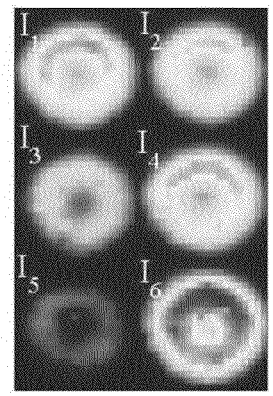
Figure 3C:
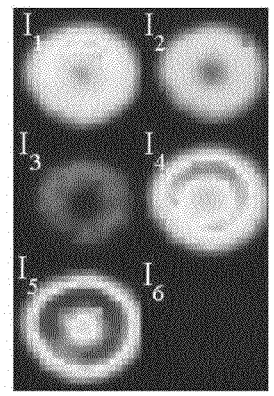
Figure 4A:
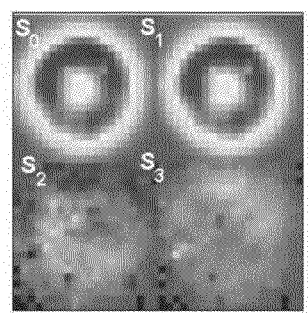
Figure 4B:
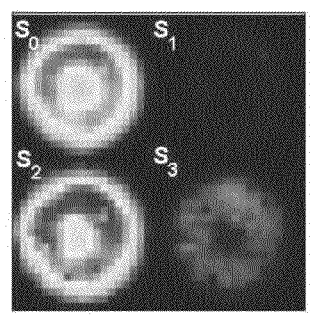
Figure 4C:
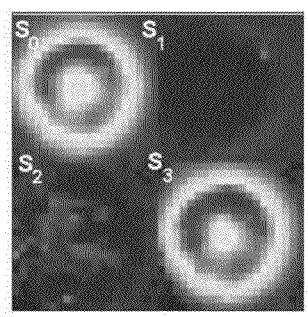

FIGS. 3A to 3C show three images of six output beams $I_1$-$I_6$ for horizontal linear polarization (FIG. 3A), 45° linear polarization (FIG. 3B) and circular polarization (FIG. 3C) of the input doughnut shaped optical beam. FIGS. 4A to 4C show corresponding Stokes parameters distribution.

The control unit (80 in FIG. 1) receives measured data indicative of images of FIGS. 153A-3C and operates to process this data to determine the Stokes parameters. The Stokes parameters at any point (x,y) within the cross-section of the input beam can be determined from the output beam component according to the following set of equations:

$$S_0(x, y) = I_1(x, y) + \alpha I_2(x, y) \quad (1)$$

$$S_1(x, y) = I_1(x, y) - \alpha I_2(x, y) \quad (2)$$

$$S_2(x, y) = \beta I_5(x, y) - \beta \alpha I_6(x, y) \quad (3)$$

$$S_3(x, y) = \sqrt{2}\left(\gamma I_3(x, y) - \gamma \alpha I_4(x, y) - \frac{S_1(x, y) + S_2(x, y)}{2}\right) \quad (4)$$

Here, $S_0(x,y)$ is the input beam intensity distribution, $S_1(x,y)$, $S_2(x,y)$ and $S_3(x,y)$ specify the polarization state distribution at each point within the cross-section of the input beam; $I_1$ and $I_2$ are the intensity distributions of the ordinary and extraordinary polarization components of the first beam component 12; $I_3$ and $I_4$ are the ordinary and extraordinary polarization components of beam component 14; and $I_5$ and $I_6$ are the ordinary and extraordinary polarization components of beam component 16; $\alpha$, $\beta$ and $\gamma$ are normalization constants obtained by:

$$I_1(x,y)=\alpha I_2(x,y), I_3(x,y)=\alpha I_4(x,y) \text{ and } I_5(x,y)=\alpha I_6(x,y) \quad (5)$$

and $$I_1(x,y)+\alpha I_2(x,y)=\gamma[I_3(x,y)=\alpha I_4(x,y)]=\beta[I_5(x,y)=\alpha I_6(x,y)] \quad (6)$$

The normalization parameters $\alpha$, $\beta$ and $\gamma$ may also be spatially dependent to account for more complex or non-uniform optical beam and/or non-uniformities in the optical setup or the pixel matrix.

FIGS. 4A-4C show the determined Stokes parameters. As expected, for the horizontal linear polarization (FIG. 4A), most of the optical intensity is observed in Stokes parameter $S_1$. Measurement of input beam having 45° linear polarization (FIG. 4B) shows that most of the optical intensity is concentrated in Stokes parameter $S_2$, and for circular polarized input beam most of the intensity is observed in $S_3$ (FIG. 4C). The device produces less than 1% undesired residual intensity in the other Stokes parameter, which do not correspond to the known polarization of the calibrated optical beam, providing an estimated error of less than 1%.

Figure 5:
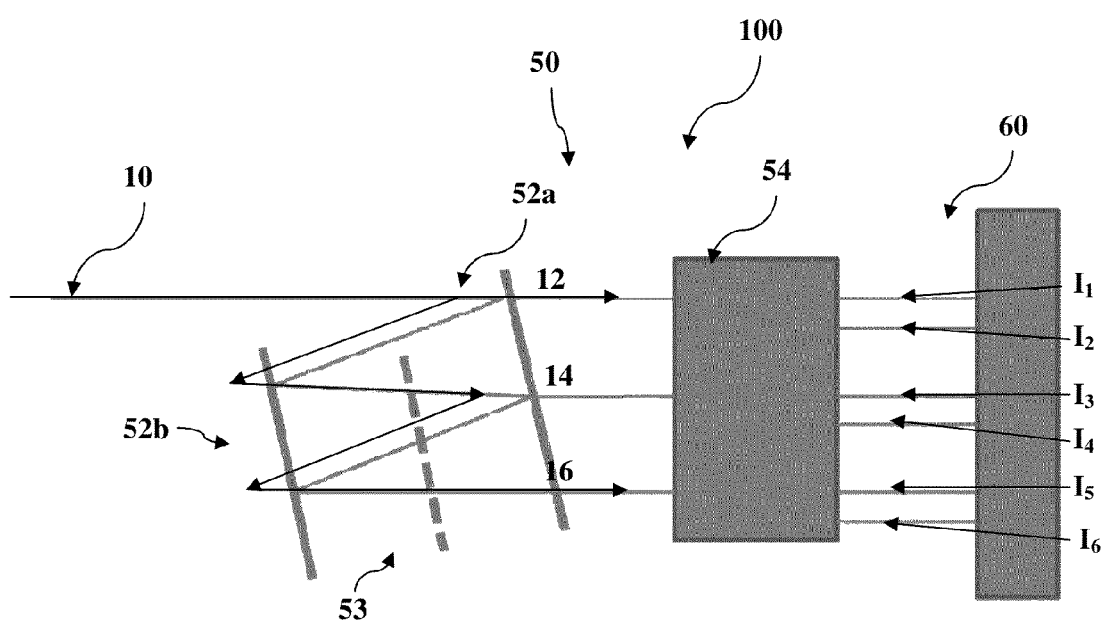
FIG. 5 shows a polarization measurement system according to another embodiment of the present invention.
Figure 6A:
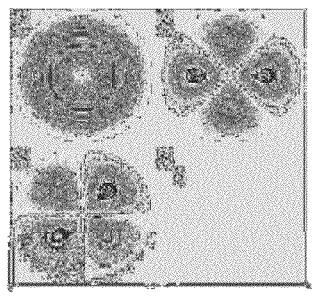
FIGS. 6A to 6C show simulated Stokes parameters (FIG. 6A), experimental results for Stokes parameters (FIG. 6B), and polarization map (FIG. 6C), all for a radially polarized optical beam.
Figure 6B:
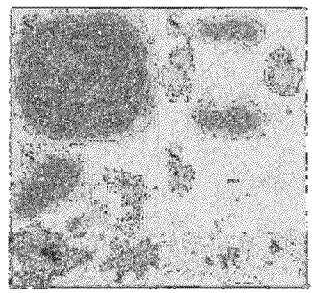
Figure 6C:
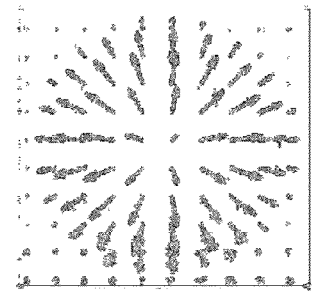

Reference is now made to FIG. 5 illustrating another example of a polarization measurement system 100 according to the present invention. To facilitate understanding, the same reference numbers are used for identifying components that are common in all the examples. In this example, a polarization beam splitter 52 includes a first, partially reflecting element (mirror) 52a, a second highly reflecting element (mirror) 52b arranged in spaced-apart substantially parallel planes, and a quarter wave plate 53 located between the two mirrors and being substantially parallel thereto. An input optical beam 10 while interacting with the polarization beam splitter 52 (mirrors 52a and 52b, and polarization rotator 53)

is split into three parallel beam components 12, 14 and 16 of different polarizations which propagate to a birefringent element 54. The polarization beam splitter 52 is oriented at a small angle (typically less than 10 degrees) with respect to the optical axis defined by the input optical beam propagation. This angle is relatively small in order to minimize variations of the beam polarization due to the reflective mirrors such that the desired polarization difference is mainly induced by the beam components passage through the polarization rotator 53. The birefringent element 54 located in the optical path of the three split beam components 12, 14 and 16, is arranged such that the main axis thereof is tilted at an angle of 22.5° with respect to the axis of the quarter wave plate 53. The birefringent element 54 splits each of the beam components 12, 14 and 16 into a pair of ordinary and extraordinary polarization components, thus producing six output beam components of different polarizations $I_1$ to $I_6$ which are detected by a pixel matrix 60.

Figure 7A:
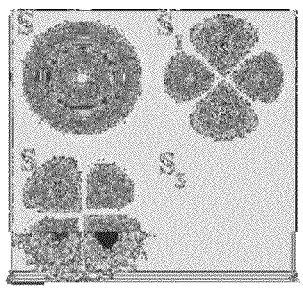
FIG. 7A to 7C show simulated Stokes parameters (FIG. 7A), experimental results for Stokes parameters (FIG. 7B) and polarization map (FIG. 7C), all for an azimuthally polarized optical beam.
Figure 7B:
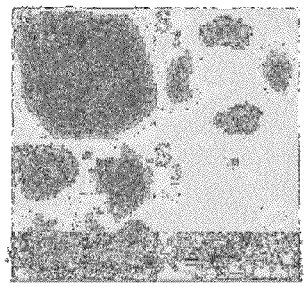
Figure 7C:
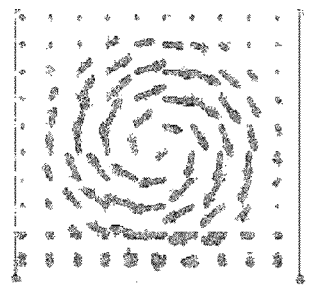

Polarization measurements of radially and azimuthally polarized optical beams are shown in FIGS. 6A-6C and 7A-7C. These figures show simulated distribution of Stokes parameters (FIGS. 6A and 7A), measured Stokes parameters according to the present invention (FIGS. 6B and 7B) and simulated vector map of the polarization distribution (FIGS. 6C and 7C) for a radially polarized optical beam (FIGS. 6A-6C) and an azimuthally polarized optical beam (FIGS. 7A-7C). Difference between the simulated and experimental Stokes parameters might be a result of imperfections which occur in any practical optical system.

As described above, the technique of the present invention for polarization measurement can also provide time-varying polarization profile of the input optical beam. A simple CCD camera constituting a pixel matrix 60 can provide a measurement rate of up to 10 ms between measurements. The use of faster cameras (higher frame rate) can provide higher time resolution measurements.

Figure 8:
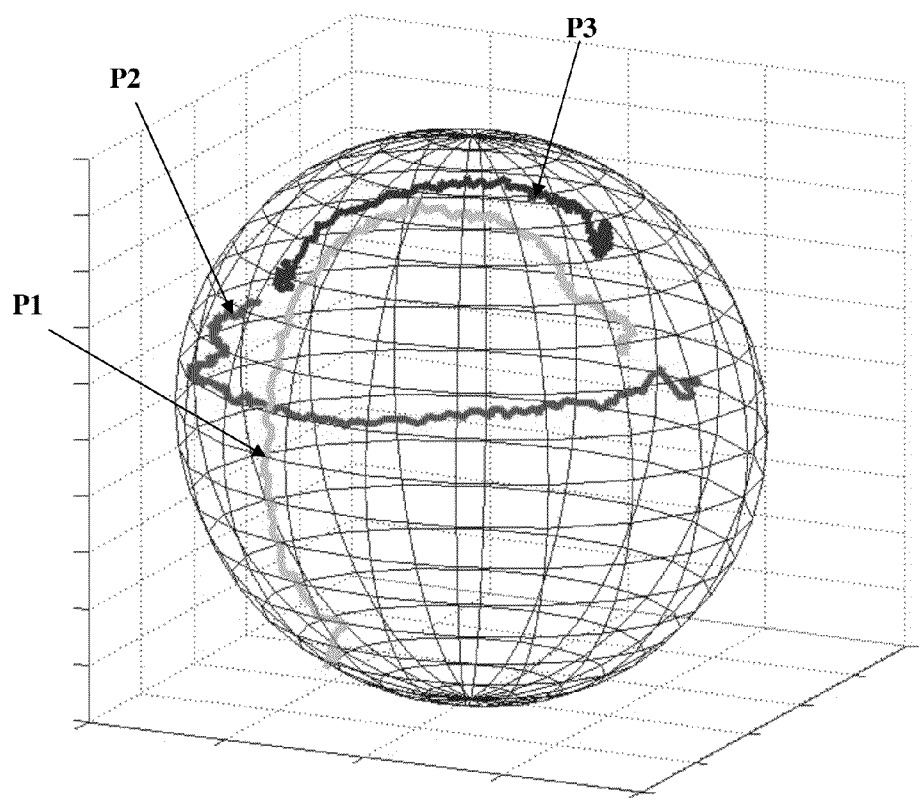
FIG. 8 shows time-varying polarization state of an input beam measured by a system configured according to the present invention.

FIG. 8 exemplifies trajectories of Stokes parameters at three points $P_1$-$P_3$ within a cross-section of an input beam as a function of time represented on a normalized Poincare sphere, measured using the system of the present invention. In this example, the input optical beam is a radially polarized beam, transmitted through a large mode area fiber amplifier having numerical aperture of 0.07, core diameter of 22 μm and cladding diameter of 125 μm. When the amplifier is turned on, thermal and stress changes in the fiber amplifier induce polarization variations in the optical beam. The polarization state of the input beam was measured by to the system of the present invention utilizing a CCD camera having a 10 ms frame rate.

Figure 9:
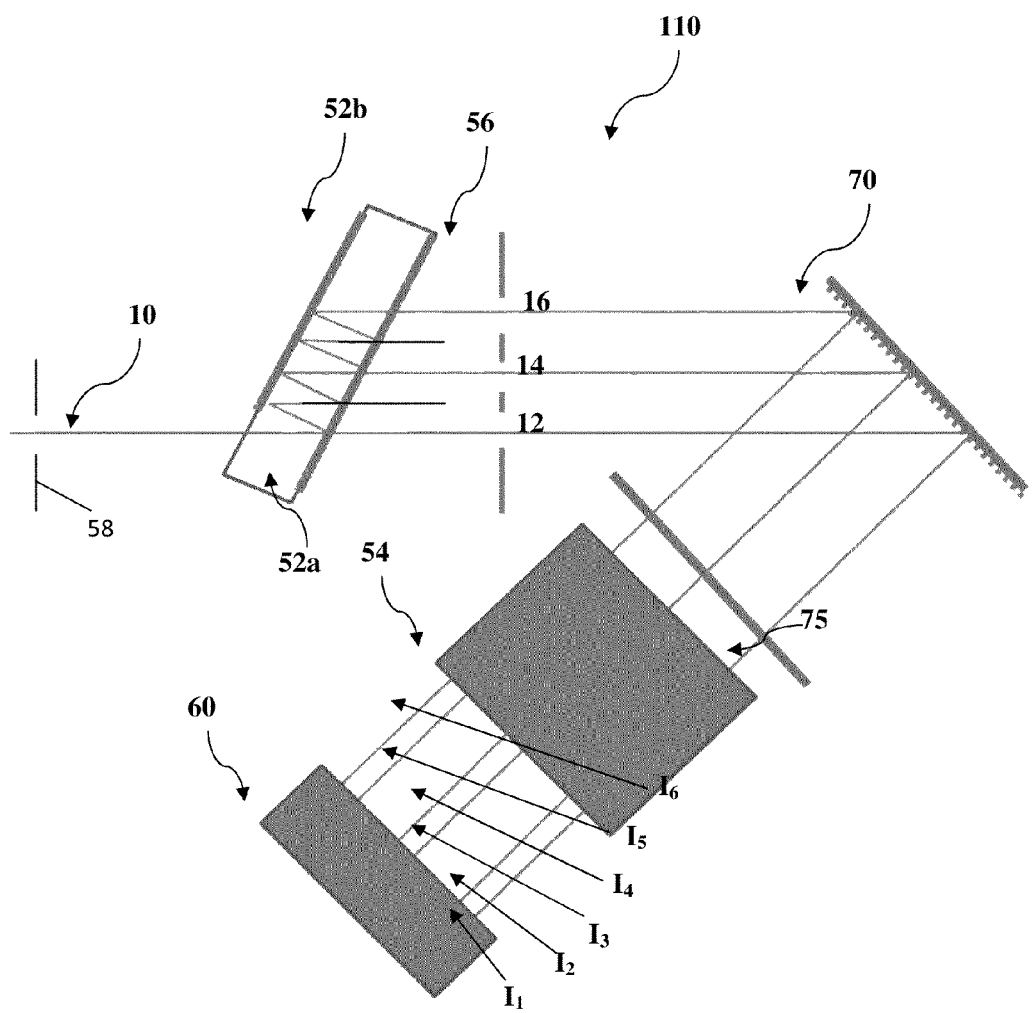
FIG. 9 shows a polarization measurement device for wavelength varying polarization according to an embodiment of the present invention

Reference is now made to FIG. 9 illustrating a polarization measurement device 110, configured according to yet another embodiment of the invention for obtaining real-time polarization state as a function of wavelength, rather than space coordinate across the beam. The system 110 similar to the above described examples includes a first polarization beam splitter 52 (configured similar to that described above with reference to FIG. 2), a birefringent element 54, and a pixel matrix 60. Also provided in system 110 are a grating 70 located in the optical path of split beam components 12, 14 and 16 propagating from polarization beam splitter 52 and a focusing lens array 75 in the optical path of light propagating from the grating 70 towards the birefringent element 54. Beam components incident onto the birefringent element correspond to a spectrum of the input beam. The birefringent element 54 Splits each of the incident beam components into ordinary and extraordinary polarization components thus producing six output beam components $I_1$-$I_6$ which are detected by the pixel matrix 60. Output of the pixel matrix presents measured data containing six data pieces indicative of spectra of six different polarization components. The polarization state for each wavelength in the input optical beam can be determined from to the six detected spectra according to the above equations 1-4.

The embodiment shown in FIG. 9 can also be configured for space-varying and wavelength varying polarization measurements along one dimension. This can be done by providing a slit 58 in the optical path of the input optical beam 10. In this configuration, the slit 58 allows only narrow strip of the cross-section of the optical input beam to enter the system which results in output intensity distribution corresponding both to the spectral and space variation of the input beam 10.

Figures 11A, 11B:
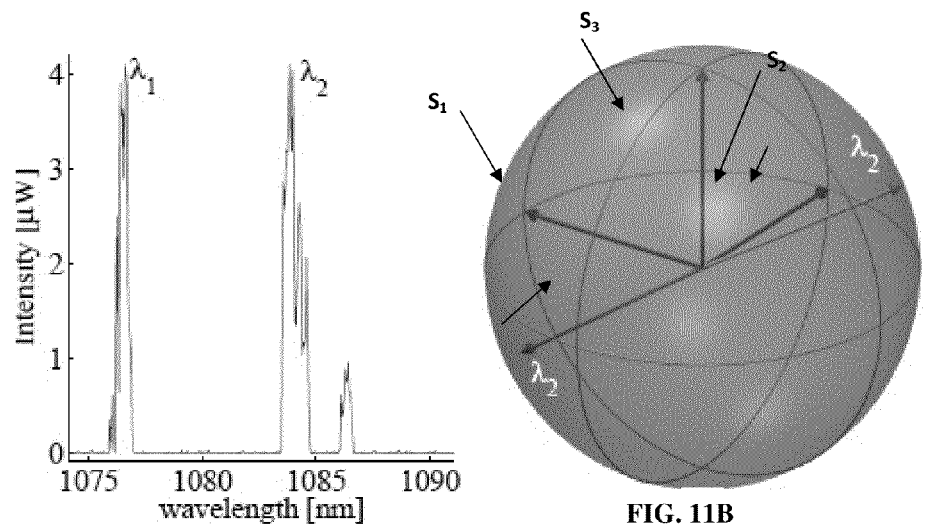
FIGS. 11A to 11B show measurements of wavelength dependent polarization state for laser light having two wavelengths.

To demonstrate the capabilities of the present invention in space-variant polarization measurements, the inventors have done a set of experiments using linearly polarized light transmitted through a fractured and stressed glass plate as the input. The fracture and the stress in the glass impose a phase shift between TE and TM polarizations and thus affect the polarization state of the input light. The full polarization state at each point across the beam was measured by a system configured according to the invention. FIGS. 10A to 10D show experimental results by imaging the fractured glass plate as imaged according to the three Stokes parameters across the plate. FIG. 10A shows an image of the fractured glass plate and FIGS. 10B to 10D show an image of the glass plate as received by calculating Stokes parameters $S_1$ to $S_3$ respectively. These figures show stress lines having higher contrast in circular polarized illumination (corresponding to $S_3$ Stokes parameter), indicating that the input linear polarized light was converted into a circular polarized light when transmitted through the glass plate. Wavelength-variant polarization measurements are shown in FIG. 11A-11B. These figures show spectrum of light from a fiber laser having two lasing wavelengths (FIG. 11A) and corresponding polarization states on a normalized Poincare sphere (FIG. 11B). The measurement system was configured in a similar manner as described in FIG. 9 utilizing a grating 70 inserted between the first polarization beam splitter 52 and the birefringent element 54. The grating 70 induces wavelength spreading to the output beam components and provides a spectrum image at the CCD, and thus the polarization at each specific wavelength can be determined simultaneously. This modified configuration enables measurement of the polarization state of the light emerging from a fiber laser with two wavelengths as a function of time. FIGS. 11A and 11B present result at a specific time, FIG. 11A shows the spectrum of the light from the fiber laser where the two lasing wavelengths are denoted as $\lambda_1$ and $\lambda_2$ and FIG. 11B shows the corresponding polarization states on a normalized Poincare sphere. The two lasing wavelengths are found to be at antipodal points on the Poincare sphere, indicating that their polarization states are orthogonal.

Thus, the present invention provides a compact system configuration for measuring space-variant polarization of light beams, being monochromatic, polychromatic or achromatic light beams, in real-time. The technique of the invention provides for obtaining full polarization state at either each point or each wavelength of the input beam with an accuracy of 98.5%. This configuration can also measure space-variant and wavelength-variant polarization states concomitantly.

The invention claimed is:
1. A system for use in measuring polarization of an optical beam, wherein the system is configured and operable for determining polarization profile along a cross section of the input optical beam, and comprises an optical system which comprises:
- a polarization beam splitting assembly configured and operable for splitting said input optical beam into a predetermined number of beam components with a predetermined polarization relation between them, the polarization beam splitting assembly comprising a first polarization beam splitter in an optical path of the input optical beam splitting said input optical beam into a first plurality of beam components with a certain polarization relation between them and a birefringent element in an optical path of said first plurality of the beam components for splitting each of them into a pair of beams having ordinary and extraordinary polarizations, thereby producing said predetermined number of output beam components; and
- a pixel matrix for detecting intensity distribution within a beam incident thereon, said pixel matrix being located in substantially non intersecting optical paths of said output beam components and generating a corresponding number of output data pieces indicative of intensity distribution within said output beam components, respectively, data contained in said data pieces being indicative of the polarization profile along the cross section of the input optical beam.

2. The system of claim 1, comprising a control unit connectable to output of the pixel matrix and configured and operable to receive said data pieces, analyze intensity distribution within each of the output beam components, determine Stokes parameters of the input optical beam which are indicative of said polarization profile.

3. The system of claim 1, wherein said predetermined number of the output beam components is six.

4. The system of claim 3, wherein said first polarization beam splitter is configured and operable to produce from the input optical beam said first plurality of beam components including three beam components.

5. The system of claim 1, wherein said polarization profile corresponds to space and time variant of polarization components within the cross-section of the input optical beam.

6. The system of claim 1, wherein
said first polarization beam splitter comprises first and second reflective surfaces accommodated in a spaced-apart substantially parallel planes intersecting with an optical axis of light propagation through the system,
the first reflective surface is partially reflective and has a segment thereof located in the optical path of the input optical beam thereby splitting said input optical beam into a first portion transmitted through said first polarization beam splitter towards the birefringent element and a second portion reflected towards the second reflective surface, said second reflective surface is relatively highly reflective and reflects said second beam portion towards a segment of the first reflective surface, said first and second reflective surfaces thereby operating together to sequentially reflect and split portions of said input optical beam into said first plurality of beam components propagating along spatially separated optical paths to the birefringent element.

7. The system of claim 6, wherein said first and second surfaces are located in the planes forming a predetermined angle with the optical axis, thereby causing polarization rotation of beam components interacting with said first and second surfaces, thereby producing said predetermined polarization relation between the beam components in said first plurality.

8. The system of claim 6, wherein said interactions with the reflective surface applies the polarization rotation to the beam components such that beam components propagating from said first and second surfaces towards the birefringent element comprise said plurality of the beam components with $\lambda/4$ optical delay between polarization components of two locally adjacent beam components.

9. The system of claim 6, wherein said first polarization beam splitter comprises an optically transparent plate having first and second opposite parallel sides at least partially coated with reflective coatings defining said first and second surfaces.

10. The system of claim 6, wherein said first and second reflective surfaces are surfaces of two spaced-apart separate elements.

11. The system of claim 10, wherein said first polarization beam splitter comprises a polarization rotator located between said first and second reflective surfaces to thereby provide said polarization relation between the beam components emerging from the first polarization beam splitter towards the birefringent element.

12. The system of claim 11, wherein said polarization rotator comprises a quarter wave plate oriented at an angle with respect to the optical axis and configured to impose a phase difference corresponding to $\lambda/4$ for each pair of locally adjacent beam components.

13. The system of claim 1 comprising a grating located between said first polarization beam splitter and said birefringent element, said grating being configured to diffract different wavelengths of said input optical beam to enable polarization measurement corresponding to different wavelengths of said input optical beam.

14. The system of claim 13, comprising a focusing lens assembly in optical path of the beam components propagating from the grating to the birefringent element.

15. The system of claim 13 comprising a slit located in an optical path of the input optical beam.

16. The system of claim 3, comprising a control unit connectable to output of the pixel matrix and configured and operable to receive said data pieces, analyze intensity distribution within each of the output beam components, and determine Stokes parameters of the input optical beam which are indicative of said polarization profile, the Stokes parameters at any point (x,y) within the cross-section of the input beam being determined from the output beam components according to the following set of equations:

$$S_0(x, y) = I_1(x, y) + \alpha I_2(x, y) \quad (1)$$

$$S_1(x, y) = I_1(x, y) - \alpha I_2(x, y) \quad (2)$$

$$S_2(x, y) = \beta I_5(x, y) - \beta \alpha I_6(x, y) \quad (3)$$

$$S_3(x, y) = \sqrt{2}\left(\gamma I_3(x, y) - \gamma \alpha I_4(x, y) - \frac{S_1(x, y) + S_2(x, y)}{2}\right) \quad (4)$$

wherein, $S_0(x,y)$ is the input beam intensity distribution, $S_1(x,y)$, $S_2(x,y)$ and $S_3(x,y)$ specify the polarization state distribution at each point within the cross-section of the input beam; $I_1$ and $I_2$ are the intensity distributions of the ordinary and extraordinary polarization components of the first beam component emerging from the first polarization beam splitter; $I_3$ and $I_4$ are the ordinary and extraordinary polarization components of the second beam component emerging from the first polarization beam splitter; and $I_5$ and $I_6$ are the ordinary and extraordinary polarization components of the third beam component emerging from the first polarization beam splitter; and $\alpha$, $\beta$ and $\gamma$ are normalization constants.

17. An optical system for use in a measurement of polarization profile along a cross section of an optical beam, the optical system comprising:

a polarization beam splitting assembly configured and operable for splitting an optical beam into six beam components with a predetermined polarization relation between them, the polarization beam splitting assembly comprising a first polarization beam splitter in an optical path of said optical beam configured for splitting said optical beam into three spatially separated beam components with a certain polarization relation between them propagating along three spaced-apart substantially parallel optical paths, and a birefringent element located in said optical paths for splitting each of said three beam components into a pair of ordinary and extraordinary polarization components, thereby producing said six beam components; intensity distribution within said six beam components of the optical beam being indicative of the polarization profile along the cross section of said optical beam; and a pixel matrix for detecting intensity distribution within a beam incident thereon, said pixel matrix being located in substantially non intersecting optical paths of said six beam components and generating output data pieces indicative of intensity distribution within said six beam components, respectively, data contained in said data pieces being indicative of the polarization profile along the cross section of the input optical beam.

18. A method for use in measuring polarization of an optical beam, the method comprising:

splitting the optical beam into three pairs of beam components with a predetermined polarization relation between the pairs, each pair comprising ordinary and extraordinary polarization components, said splitting comprising interacting the optical beam with a first polarization beam splitter for splitting said optical beam into three spatially separated beam components with a certain polarization relation between them propagating along three spaced-apart substantially parallel optical paths, and interacting said three spatially separated beam components with a birefringent element for splitting each of said three beam components into a pair of ordinary and extraordinary polarization components, thereby producing said three pairs of beam components with intensity distribution within said six beam components being indicative of the polarization profile along the cross section of said optical beam;

using a pixel matrix located in substantially non intersecting optical paths of said pairs of beam components for detecting said beam components and measuring intensity distribution within each of the beam components, analyzing the intensity distributions of the beam components and determining a polarization profile along a cross section of the optical beam.

19. The method of claim 18, wherein said analyzing the intensity distributions of the six beam components comprising determining Stokes parameters of the input optical beam which are indicative of said polarization profile, the Stokes parameters at any point (x,y) within the cross-section of the input beam being determined from the output beam components according to the following set of equations:

$$S_0(x, y) = I_1(x, y) + \alpha I_2(x, y) \tag{1}$$

$$S_1(x, y) = I_1(x, y) - \alpha I_2(x, y) \tag{2}$$

$$S_2(x, y) = \beta I_5(x, y) - \beta \alpha I_6(x, y) \tag{3}$$

$$S_3(x, y) = \sqrt{2}\left(\gamma I_3(x, y) - \gamma \alpha I_4(x, y) - \frac{S_1(x, y) + S_2(x, y)}{2}\right) \tag{4}$$

wherein, $S_0(x,y)$ is the input beam intensity distribution, $S_1(x,y)$, $S_2(x,y)$ and $S_3(x,y)$ specify the polarization state distribution at each point within the cross-section of the input beam; $I_1$ and $I_2$ are the intensity distributions of the ordinary and extraordinary polarization components of the first beam component emerging from the first polarization beam splitter; $I_3$ and $I_4$ are the ordinary and extraordinary polarization components of the second beam component emerging from the first polarization beam splitter; and $I_5$ and $I_6$ are the ordinary and extraordinary polarization components of the third beam component emerging from the first polarization beam splitter; and $\alpha$, $\beta$ and $\gamma$ are normalization constants.

* * * * *